United States Patent [19]

Potter

[11] Patent Number: 6,131,102
[45] Date of Patent: Oct. 10, 2000

[54] METHOD AND SYSTEM FOR COST COMPUTATION OF SPELLING SUGGESTIONS AND AUTOMATIC REPLACEMENT

[75] Inventor: Douglas W. Potter, Seattle, Wash.

[73] Assignee: Microsoft Corporation, Redmond, Wash.

[21] Appl. No.: 09/094,955

[22] Filed: Jun. 15, 1998

[51] Int. Cl.[7] .................................................. G06F 17/21
[52] U.S. Cl. .......................................... 707/533; 707/532
[58] Field of Search ................................... 707/532, 533, 707/501; 400/63

[56] References Cited

U.S. PATENT DOCUMENTS

| | | | |
|---|---|---|---|
| 4,913,566 | 4/1990 | Sakai et al. ............................... | 400/63 |
| 4,915,546 | 4/1990 | Kobayshi et al. ...................... | 400/697 |
| 5,258,909 | 11/1993 | Damerau et al. ........................ | 707/533 |
| 5,261,112 | 11/1993 | Futatsugi et al. ........................ | 707/533 |
| 5,802,205 | 9/1998 | Emico et al. ............................ | 382/187 |
| 5,845,306 | 12/1998 | Schabes et al. .......................... | 707/532 |

OTHER PUBLICATIONS

Spelling mistakes: how well do correctors perform?; D. G. Hendry and T. R. G. Green; INTERACT '93 and CHI '93 conference companion on Human factors in computing systems, 1993, pp. 83–84.

Small domains spell fast strictness analysis; R. C. Sekar, Shaunak Pawagi and I. V. Ramarkrishnan; Proceedings of the seventeeth annual ACM symposium on Principles of programming languages , 1990, pp. 169–183.

*Primary Examiner*—Stephen S. Hong
*Attorney, Agent, or Firm*—Jones & Askew LLP

[57] ABSTRACT

Suggestions may be ordered by their associated costs so that the best suggestions may be displayed to the user and so that, in certain instances, a misspelled word entered by the user may be automatically replaced with a suggestion. To begin generating suggestions and costs, the user input and dictionary word (path of a trie) are considered in parallel. State variables are maintained such as the current cost of the dictionary word and the number of letter positions that have gone unmatched up to the current pointer position, also referred to as the offset. If the offset is zero and the next letters match, the cost associated with the dictionary word is maintained equal to zero. However, if the offset is zero and the next letters of the user input and the dictionary word do not match, then a cost for the dictionary word may not yet be determined. Otherwise, if the offset is greater than zero, possible paths in the trie and associated costs for the paths are determined. If a cost or multiple costs are determined, then the cost(s) is applied to the dictionary word, the offset is set to zero, and the matching process continues. If a cost can not be determined, then the offset is incremented by one and the matching process continues. Dictionary words (paths) are eliminated from consideration when their associated costs become too high. At the end of the matching method, the dictionary word (path) with the lowest cost is typically the best suggestion to replace the misspelled word.

8 Claims, 8 Drawing Sheets

```
TraverseRoutine (TrieState)
{
    While (TrieState valid)
    {
        put this letter into the array
        If (Word end)
            Print word
        TrieStateNext = TrieState → Down
        If (TrieStateNext valid)
        {
            increment array position
            TraverseRoutine (TrieStateNext)
            decrement array position
        }
        TrieState = TrieState → right
    }
}
```

(PRIOR ART)
FIG.3

| User | Dict | Score | Example |
|------|------|-------|---------|
| sl | tl | 35 | hussle ⟶ hustle |
| k | qu | 35 | kiche ⟶ quiche |
| ede | ead | 22 | lede ⟶ lead |
| id | de | 30 | lemonaid ⟶ lemonade<br>traid ⟶ trade |
| ff | ft | 40 | offen ⟶ often |
| ul | le | 50 | particul ⟶ particle |
| k | ch | 30 | skism ⟶ schism |

FIG.6

```
Traverse (TrieState, SuggestionState)
{
        While (TrieState valid)
        {
                Determine all possible Suggestion States
                For each possible Suggestion State (ThisSuggestionState)
                {
                        If (score low enough)
                        {
                                If (Dictionary Word end)
                                {
                                        do any word ending costing
                                        if score low enough, add to suggestion list
                                        if (Letters left in User Input)
                                        {
                                                add space or other joining punctuation
                                                TrieStateNew = TrieState ⟶ Reset
                                                Traverse (TrieStateNew, ThisSuggestionState)
                                        }
                                }
                                TrieStateNew = TrieState ⟶ Down
                                If (TrieStateNew valid)
                                        Traverse (TrieStateNew, ThisSuggestionState)
                        }
                }
                TrieState = TrieState ⟶ Right
        }
}
```

FIG.7

METHOD AND SYSTEM FOR COST COMPUTATION OF SPELLING SUGGESTIONS AND AUTOMATIC REPLACEMENT

TECHNICAL FIELD

This invention relates to word processing program modules. More particularly, this invention relates to a method and system for computing a cost in association with a suggestion for replacing a misspelled word in an electronic document and automatically replacing the misspelled word.

BACKGROUND OF THE INVENTION

Documents often contain a number of errors, such as spelling errors which may reflect negatively on the writer of the document. For example, the recipient of a document containing errors may make the presumption that the writer lacks education, that the writer is lazy, that the writer prepared the document hastily or that the writer has other negative characteristics. Most writers want to avoid having these presumptions made about them and, thus, try to prepare their documents as accurately as possible.

Word processor program modules have been effective in helping users eliminate many errors in their documents. Most modem word processor program modules provide effective tools for proofing the composition of electronic documents. For example, spell checking program modules have a long history in word processing program modules.

Most spell checker program modules include a dictionary, or a list of words, to support spell checking operations. To spell check a document, the spell checker program module compares the words in the document with the words in the dictionary to determine if the words in the document correspond to, or match, words in the dictionary. If a word does not correspond to a word in the dictionary, then an indication is provided to the user that the word is not in the dictionary and, therefore, may be misspelled. In addition, many spell checker program modules provide other features, such as lists of suggestions to replace the misspelled word, indications of words that have been repeated and, indications of words that may need to be capitalized.

Algorithms for offering suggestions for a word not in the dictionary are particularly problematic. Although some spell checkers offer adequate suggestions lists, there are many misspelled words for which the obvious suggestions are not generated. For example, for the misspelled word "munkey", an obvious correct suggestion is "monkey". However, some spell checkers do not generate the suggestion of "monkey" for the misspelled word "munkey".

There is a need for an improved method and system for generating suggestions for misspelled words. There is a further need for an improved method and system for determining a best suggestion to replace a misspelled word. There is still a further need for an improved method and system for automatically replacing a misspelled word with a suggestion if it is highly likely that the suggestion is the word that the user desired in the document.

SUMMARY OF THE INVENTION

The present invention satisfies the above described needs by providing a method and system for generating suggestions for misspelled words. In one aspect, suggestions are generated for a particular user input using a "sloppy" trie traversal. Whether a match between the dictionary word and the user input is sufficiently good is determined via a numerical cost.

As the dictionary trie is traversed, costs are calculated for the words in the dictionary words (paths) against the user input. When the cost for a particular path becomes too high, that path is dropped. Hence, if the user input is "xxx" and the dictionary word is "yyy", the cost may become so large after the second or third "y" that any other dictionary words that begin with "yyy" need not be considered as possible suggestions. This "pruning" of the dictionary trie enables trie traversal in an economical manner.

One way of looking at this is that the user input and dictionary word are considered in parallel. A first pointer is positioned at the beginning of the user input and a second pointer is positioned at the beginning of the dictionary word. Some state variables are maintained, such as the current cost for the dictionary word and the number of previous letters that mismatched (the offset). If the offset is zero, i.e., all the letters have matched until this point, then the current cost is zero and traversal continues. If the offset is zero and the current letters don't match, i.e., this is the first letter that doesn't match, then a cost cannot yet be determined and traversal continues. Otherwise, a cost is determined if possible. The cost is applied, the offset is set equal to zero, and traversal of the trie continues.

For example, consider the user input "acheive" and the dictionary word "achieve". The letters of both words match until the pointer for the user input is on the first "e" and the dictionary pointer is on the first "i". The error cannot be determined, so the last letter that didn't match is stored, the offset is set equal to one, and traversal of the trie continues. With the pointers incremented, the next letters are examined and it is determined that a primary candidate for the error is a transposition. The cost for a transposition of "i" and "e" is applied to the dictionary word, the offset is returned to zero and traversal of the trie continues. The rest of the letters in the path for "achieve" match, so the total cost for the suggestion of "achieve" is the penalty, or cost, for the transposition.

After a cost is computed for each suggestion, the suggestions are ordered based on the cost. The suggestion with the lowest cost is the best suggestion. Thus, only the best suggestions for replacing the user input are offered to the user. Moreover, a criterion for automatically replacing a misspelled word with the best suggestion may be established using the computed costs. For example, if the cost of one suggestion is much lower than all other suggestions, it is likely that the low cost suggestion is the correct spelling and the user input may be automatically replaced with this suggestion.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

FIG. 3 is an illustration of a typical trie traversal routine known in the art.

FIG. 6 is an illustration of typical entries in a built-in string list in accordance with an embodiment of the present invention.

FIG. 7 is an illustration of a modified, or "sloppy", trie traversal routine utilized in an embodiment of the present invention.

DETAILED DESCRIPTION

Figure 1:
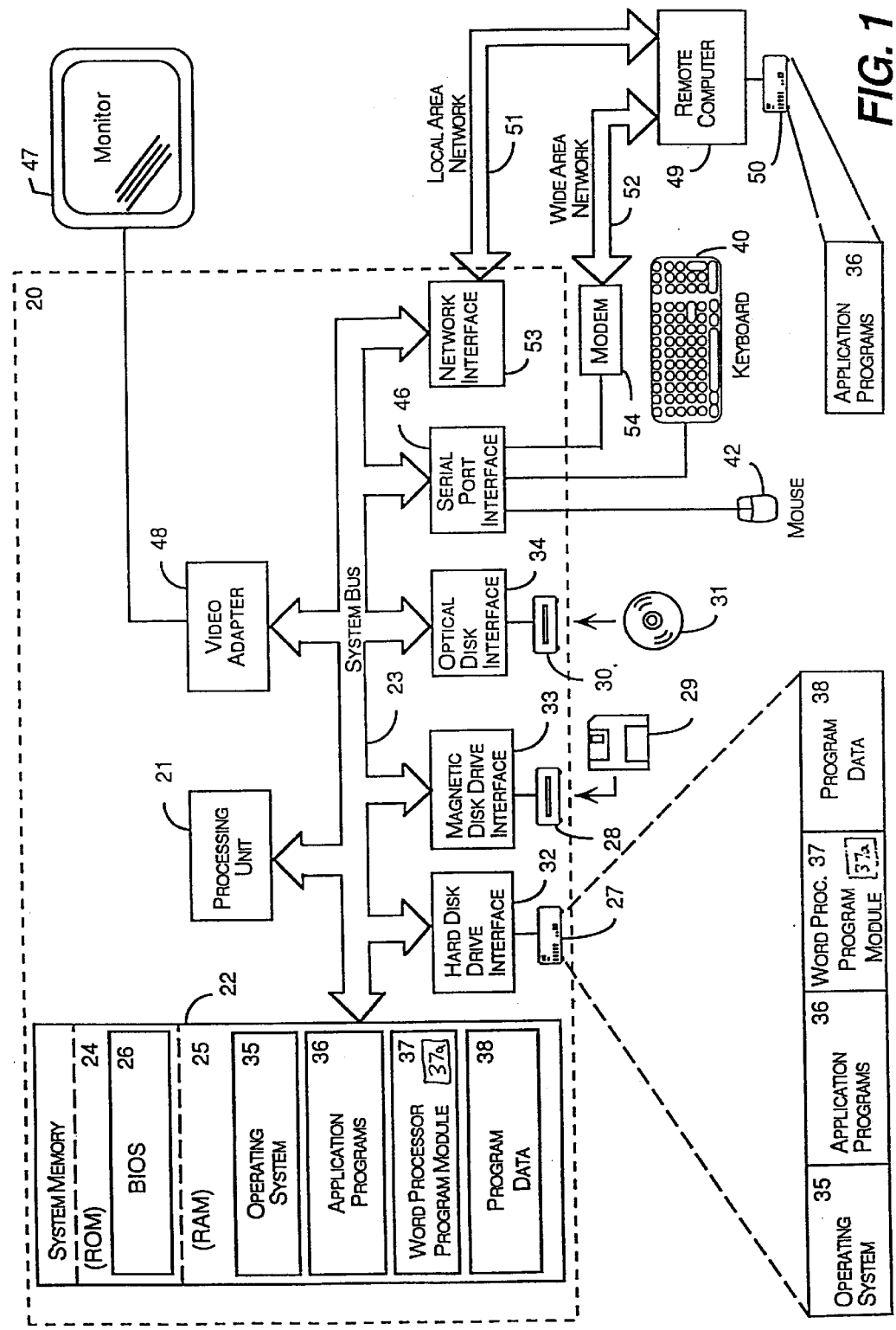
FIG. 1 is a block diagram of a computer that provides the exemplary operating environment for the present invention.

The present invention is directed to an improved method and system for generating a cost, or score, in association with a possible suggestion to replace a misspelled word in an electronic document. It should be understood that suggested word, path, and dictionary word may also be used herein to refer to a possible suggestion. The present invention is further directed to an improved method and system for replacing a misspelled word in a document with a suggested word if it is highly likely that the user intended to enter the suggested word in the document. In one embodiment, the invention is incorporated into a preferred word processing application program entitled "WORD 9.0", marketed by Microsoft Corporation of Redmond, Wash. Briefly described, the preferred application program allows a user to create and edit electronic documents by entering characters, symbols, graphical objects, and commands. "WORD 9.0" includes a spell checker program module that incorporates this invention.

The spell checker program module, after detecting a spelling error of a user input, typically generates a cost, or score, in association with a number of possible suggestions to replace the user input. The spell checker program module may then use the costs of suggested words to generate a suggestion list. Moreover, if one suggested word is much closer to the user input than all other suggested words, then the user input may be automatically replace d with the suggested word.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37, program data 38, and other program modules (not shown). The word processor program module 37 may include a spell checker program module 37a.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having briefly described the exemplary operating environment, a brief description of tries, also known as digital trees, will be provided below before describing further aspects of the present invention.

Tries (Digital Trees)

Figure 2:
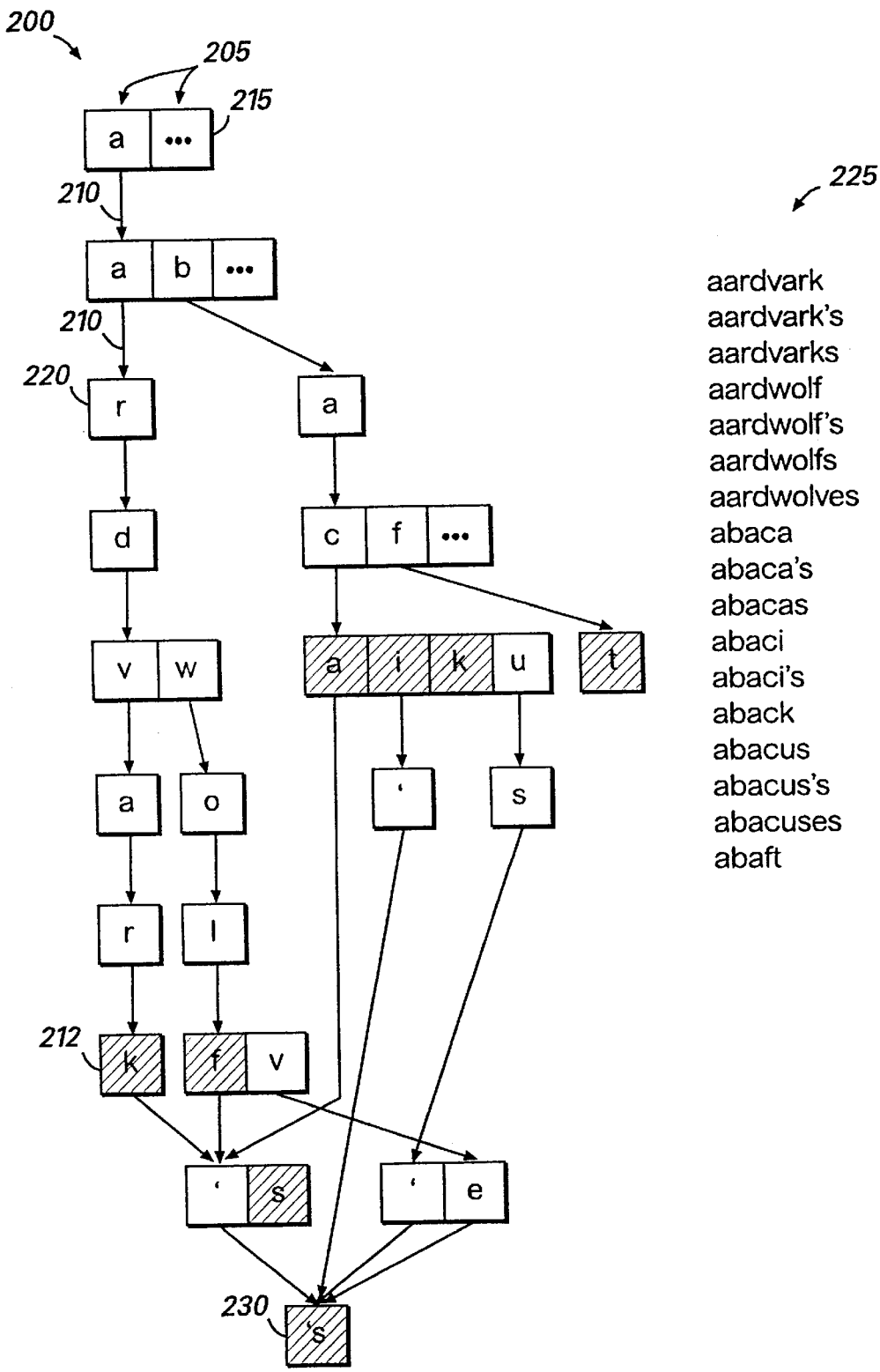
FIG. 2 is an illustration of some of the nodes of a trie for various words in a dictionary.

A common method for storing dictionary information is a trie, also referred to as a digital tree. There are a number of ways to represent a trie, such as by representing the trie as a series of nodes. FIG. 2 is an illustration of some of the nodes 205 of trie 200 for various words in a dictionary. Each node has a letter and may also include one or more flags. Each node may also include down pointers 210 and right pointers to other nodes. In FIG. 2, adjacent nodes are connected by right pointers. One of the flags may be an end-of-word flag, illustrated as a shaded node, such as node 212, in FIG. 2. As referred to herein, a state is a series of nodes connected by right pointers.

In a complete dictionary, the top state 215 of the trie 200 is typically all the allowed first letters of words in the dictionary, i.e., for English, the letters "A" through "Z". The down pointer from each node points to the first node in the state of allowed following letters. For example, at node 220, the first allowed letter is "r".

By following the possible transitions, or paths, the words in the list 225 may be reproduced. When a down pointer is followed, the node that the down pointer points to may be followed or any of the nodes to the right of that node may be followed. It should also be noted that every node has a down pointer or is a word end node. In fact, many nodes have a down pointer and also are word end nodes.

FIG. 2 also illustrates compression techniques used with tries, such as ending compression. For example, node 230 is pointed to from many different nodes. Thus, a single storage value or location may be used to represent the "s" stored in node 230. Tries and various compression techniques are well-established methods for representing and storing dictionaries and a detailed description is beyond the scope of this document.

Trie Traversal

To visit all the nodes in a trie, and, hence, extract all of the words included in a trie, methods are well-known in the art for setting up an array of letters and filling each position in the array in succession. For example, the first position of the array is set to the first possible letter, then the next position is set to the next possible following letter and so forth. Every instance of an end node means that a word in the trie, or a dictionary word, has been found. It should be understood that in order to verify that a word is in the dictionary, or spell check a word, the down pointer of a node needs to be followed only if the current letter in the node matched the letter of the user input.

FIG. 3 is an illustration of a typical trie traversal routine known in the art.

Computing Costs of Spelling Suggestions

Briefly described, the present invention is directed to an improved method and system for computing a cost in association with a suggestion for a misspelled word in a document. The cost is typically a numerical cost. The invention also comprises a method and system for automatically replacing a misspelled word in a document with a suggestion if the suggestion has a much lower cost than other suggestions. Thus, the present invention allows suggestions to be ordered by their associated costs so that the best suggestions may be displayed to the user and so that, in certain instances, a misspelled word entered by the user may be automatically replaced with a suggestion.

In one embodiment, after a misspelled word is located, the present invention computes a numerical cost, or score, in association with each suggestion. The cost typically depends on the following:

1. the type of transformation (such as a substitution, a deletion, an insertion, or a transposition);
2. the actual letters involved in the transformation;
3. the position of the transformation in the word (such as the beginning of a word or the end of a word); and
4. the usage frequency of the dictionary word.

In one embodiment of the present invention, the lower the cost is for a suggestion, the better the suggestion is. The costs may be used to determine which suggestions to display to the user and to determine if an automatic replacement is proper.

As known in the prior art, to spell-check a user input, a trie is traversed in a well-known manner as described above in reference to FIGS. 2 and 3. A complete path in a trie generates a dictionary word. Thus, dictionary word, path, and suggested word may be used interchangeably herein. In spell-checking (verification), the down pointer of a node of a trie is followed only if the current letter of the dictionary word matches the current letter of the user input. The present invention, in one embodiment, uses a "sloppy" trie traversal to generate suggestions. In other words, in one embodiment of the present invention, the down pointer of a node is followed even if the last letter of the dictionary word did not match the last letter of the user input, unless the cost associated with the dictionary word exceeds a predetermined threshold level.

The traversal is the equivalent of considering the user input and dictionary word in parallel. A first pointer is positioned at the beginning of the dictionary word and a second pointer is positioned at the beginning of the user input. State variables are maintained such as the current cost of the dictionary word and the number of letter positions that have gone unmatched up to the current pointer position. The state variable indicating the number of letter positions that have gone unmatched is also referred to as the offset. One can compute a cost between two words by considering any two words in parallel. The trie traversal is a particularly efficient method of doing this for an entire dictionary.

If the offset is zero and the next letters match, the cost associated with the dictionary word is maintained equal to zero. However, if the offset is zero and the next letters of the user input and the dictionary word do not match, the offset becomes one and the method continues because a cost for the dictionary word may not yet be determined. An offset of zero means that all costs have been computed for any differences between the user input and the dictionary word up until the point in the user input and the dictionary word that is currently being examined.

Otherwise, if the offset is greater than zero, possible paths, or options, in the trie and associated costs for the paths, or options, are determined. If a cost or multiple costs are determined, then the cost(s) is applied to the dictionary word, the offset is set to zero, and the matching process continues. If a cost can not be determined, then the offset is incremented by one and the matching process continues. Dictionary words (paths) are eliminated from consideration when their associated costs become too high. At the end of the matching method, the dictionary word (path) with the lowest cost is typically the best suggestion to replace the misspelled word.

It should be understood that typically the associated cost for a dictionary word (path) is determined by using an internal database of typical user transformations, also referred to as built-in strings. The generic type of transformation may also be determined, if possible, including an associated generic cost for the type of transformation. For example, in one embodiment, the generic type of transformation may be a substitution, deletion (drop), insertion, or transposition.

Having briefly described the present invention above, an embodiment of the present invention will be described below in reference to FIG. 4.

Figure 4:
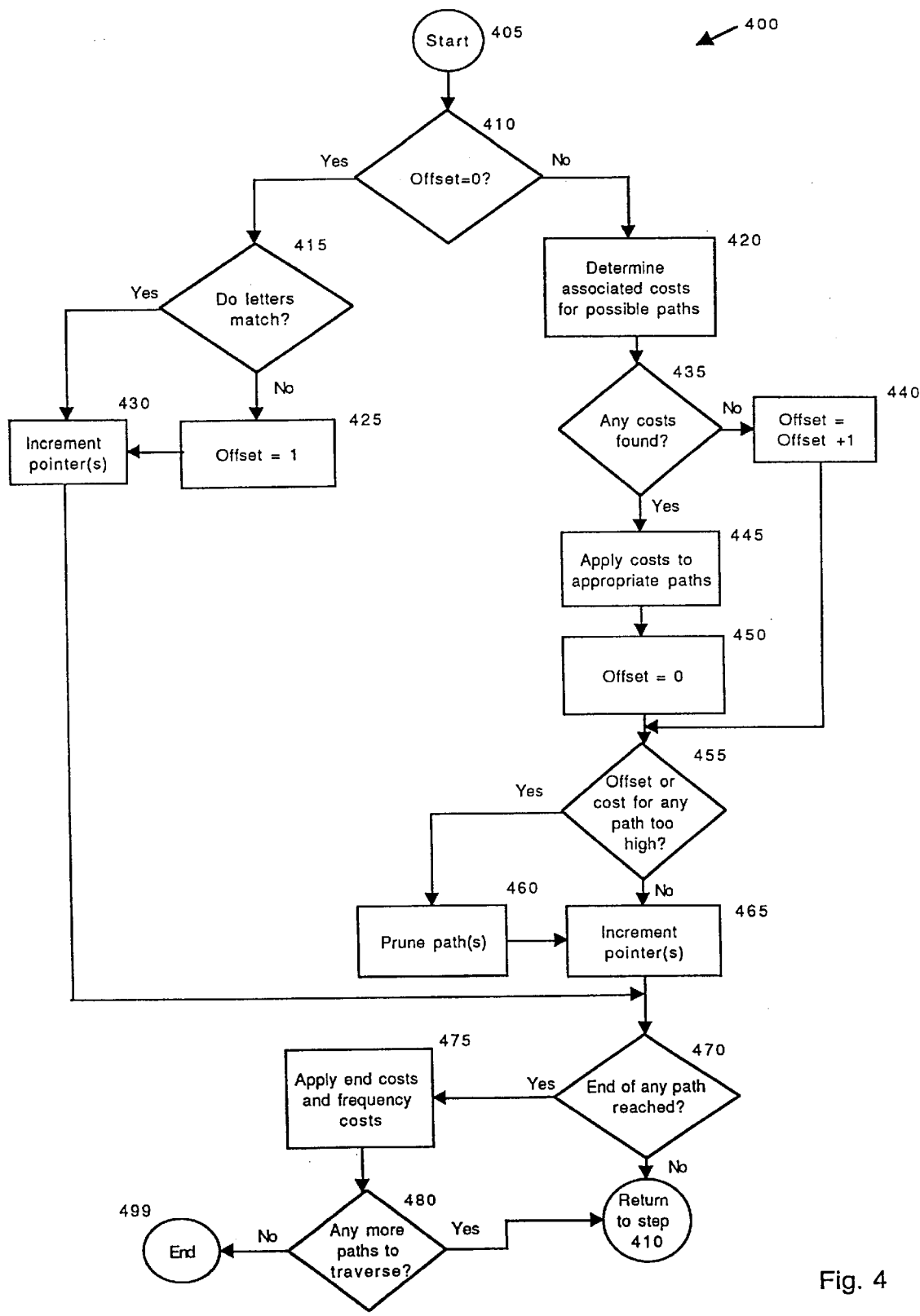
FIG. 4 is a flow chart illustrating a method for computing a total numerical cost in association with a suggested word to replace a misspelled word in accordance with an exemplary embodiment of the present invention.

FIG. 4 is a flow chart illustrating a method 400 for computing a total numerical cost in association with a suggested word to replace a misspelled word in accordance with an exemplary embodiment of the present invention. Those skilled in the art will appreciate that this exemplary embodiment is a computer-implemented process that is carried out by the computer in response to input from the user and instructions provided by a program module.

Referring to FIG. 4, the method 400 begins at start step 405 and proceeds to decision step 410, such as when it is determined that the user input is a misspelled word. At decision step 410, it is determined whether an offset is equal to zero. The offset is a state variable indicating the number of letter positions that have gone unmatched for a particular path in the dictionary trie. It should be understood that when method 400 begins the offset is typically set equal to zero for each path.

If, at decision step 410, it is determined that the offset is equal to zero, then the method proceeds to decision step 415. However, if, at decision step 410, it is determined that the offset is not equal to zero, then the method proceeds to step 420.

It should be understood that decision step 410 is decided for each path in the trie and that method proceeds to step 415 for the paths for which the offset is zero and that the method proceeds to step 420 for the paths for which the offset is not equal to zero.

At decision step 415, it is determined whether the letter of the user input pointed to by the user input pointer matches the letter of the dictionary word pointed to by the dictionary word pointer. It should be understood that the dictionary word referred to herein is typically generated by following a path between nodes in a trie as is well-known to those skilled in the art. However, the dictionary word may be generated using any acceptable means other than tries.

If, at decision step 415, it is determined that the letters do not match, then the method 400 proceeds to step 425.

However, if, at decision step 415, it is determined that the letters do match, then the method proceeds to step 430.

At step 425, the offset for the path is set equal to one and the method proceeds to step 430.

At step 430, the user input pointer and/or dictionary word may be incremented and the method proceeds to decision step 470.

Returning to decision step 410, if it is determined that the offset is not equal to zero, then the method 400 proceeds to step 420. At step 420, associated costs for paths, or options, are determined, if possible. It should be understood that at this point a number of "options" may be determined. It may also be determined that there are no options, in which case there is no reasonable suggestion on this path. It may also be determined that there are one or more options (see the example below regarding the dictionary word "development"). For each option, a cost may be determined, the offset is set to zero, and the method continues. Alternatively, determination of a cost may be delayed, the offset may be increased by one and the method continues. If a cost is determined, the user pointer may also be adjusted as described below at step 465. After associated costs for paths are determined, the method 400 then proceeds from step 420 to decision step 435.

At decision step 435, it is determined whether any associated costs were found at step 420. If not, then the method proceeds to step 440. However, if associated costs were found at step 420, then the method proceeds to step 445.

At step 440, the offset is incremented by one and the method proceeds to decision step 455.

At step 445, the costs are applied to the associated paths, and the method proceeds to step 450.

At step 450, the offset is set equal to zero for the paths in which costs were applied at step 445 and the method 400 proceeds to decision step 455.

At decision step 455, it is determined whether the cost for any path is higher than a predetermined threshold value. It should be understood that the cost of a particular path may become so large that it is impractical to follow this path any longer. Thus, this path may be "pruned" and no longer followed so that the entire method 400 is more efficient.

If not, then the method proceeds to step 465. However, if, at decision step 455, it is determined that the costs for a particular path exceeds the predetermined threshold values, then the method proceeds to step 460.

At step 460, any paths with associated costs exceeding the predetermined threshold value are eliminated as possible suggested words to replace the user input. The method then proceeds to step 465.

At step 465, the user input pointer and dictionary word pointer may be incremented and the method proceeds to decision step 470.

At decision step 470, it is determined if the end of any word has been reached. If so, then the method proceeds to step 475. If not, then the method returns to step 410.

At step 475, end costs and frequency costs are applied to the path and a total cost for the path is obtained. Frequency costs are based on the frequency that a word is used in English (or other language). End costs refer to penalties if the last letter of a suggestion does not match the user input. It should also be understood that beginning costs may be applied earlier in the method 400 when considering the beginning of a dictionary word. The method then proceeds to decision step 480. At decision step 480, it is determined whether there are any remaining possible paths to be followed. If so, then the method returns to decision step 410. If not, then the method ends at step 499.

Figure 5:
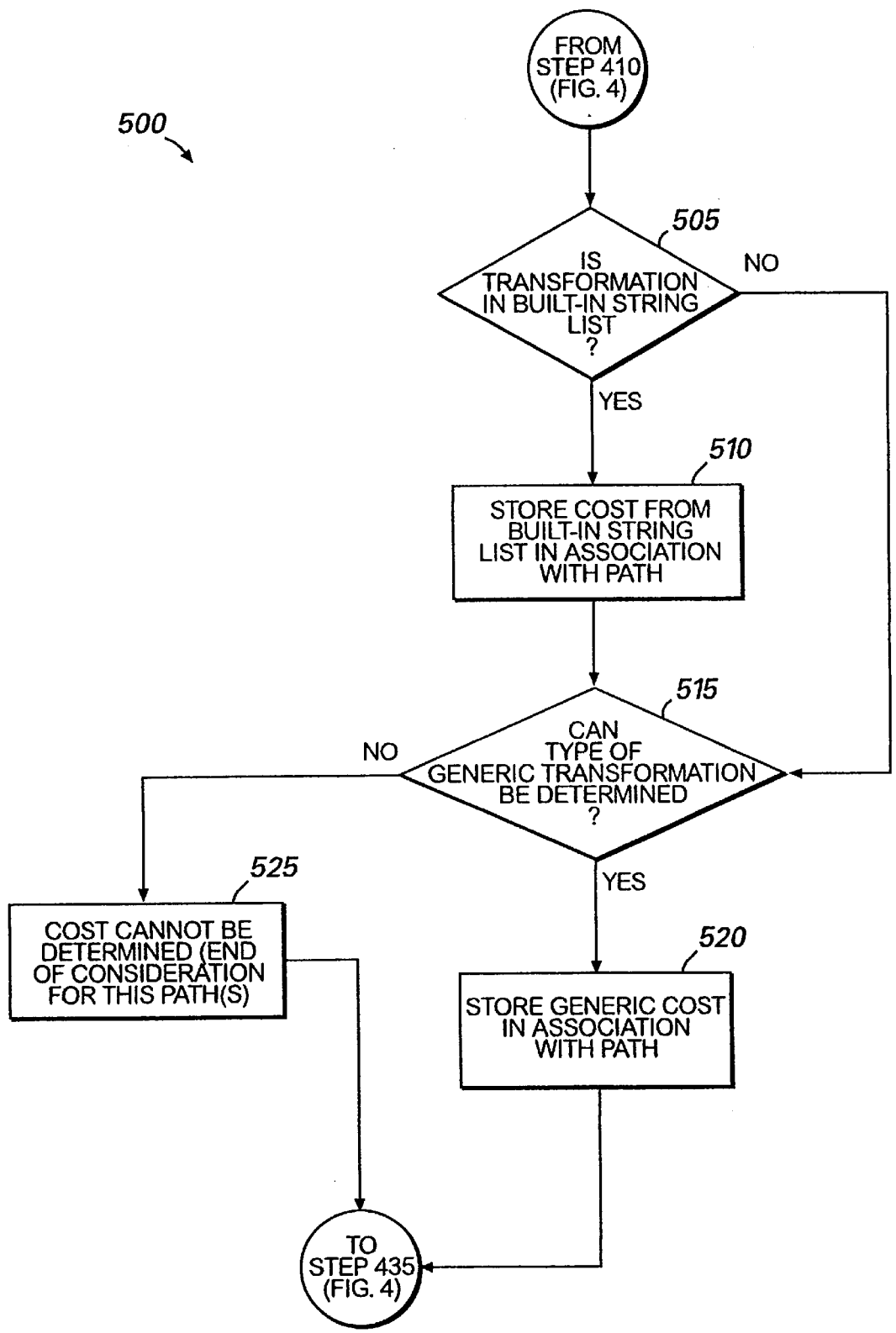
FIG. 5 is a flowchart illustrating a method for determining associated costs for a path from a built-in string list or generic transformation type in accordance with an exemplary embodiment of the present invention.

Referring now to FIG. 5, a flowchart illustrating a method 500 for determining associated costs for a path from a built-in string list or generic transformation type in accordance with an exemplary embodiment of the present invention is shown. The method 500 may be used to determine associated costs as part of step 420 (FIG. 4).

The method 500 begins at decision step 505 where it is determined whether the transformation between the user input and the path (dictionary word) is found in a built-in string list. The built-in string list is a database or routine that includes a number of different specific errors that a user may typically make when spelling and entering a word in an electronic document. If not, then the method 500 proceeds to decision step 515. However, if the transformation is found in the built-in string list, then the method 500 proceeds to step 510.

At step 510, the cost from the built-in string list is stored in association with the path. The method then proceeds to decision step 515.

At decision step 515, it is determined whether the generic type(s) of transformation can be determined. For example, in one embodiment of the present invention, although not in the built-in string list, the transformation may be a substitution, deletion (drop), insertion, or transposition.

It should be understood that generic transformations are searched for whether or not the transformation was found in the built-in list. However, generic substitutions are not searched for transformations that were found to be built-in substitutions. Likewise, generic transpositions are not searched for transformations that were found to be built-in transpositions, generic insertions are not searched for transformations that were found to be a built-in insertion, and generic deletions are not searched for transformations that were found to be a built-in deletion.

It should also be understood that it is possible to find more than one transformation in the built-in list. It is also possible to find more than one transformation when looking for generic transformations. The total list of possibilities becomes the list of possible "options" or paths. It's possible that neither the search of the built-in list nor the search of the generic transformations gives any options, which ends consideration of this path.

If, at decision step 515, the generic type(s) of transformation may be determined, then the method proceeds to step 520. However, if at decision step 515, it is determined that the generic type(s) of transformation cannot be determined, then the method proceeds to step 525.

At step 520, the generic cost for a particular type of generic transformation is stored in association with the path. The generic cost is typically a numerical value that is utilized for a particular generic type of transformation. For example, a generic deletion transformation may have a generic cost of 30. The method then proceeds to step 435 (FIG. 4).

At step 525, an indication that no cost could be determined is stored in association with the path. The method then proceeds to step 435 (FIG. 4).

Figure 5A:
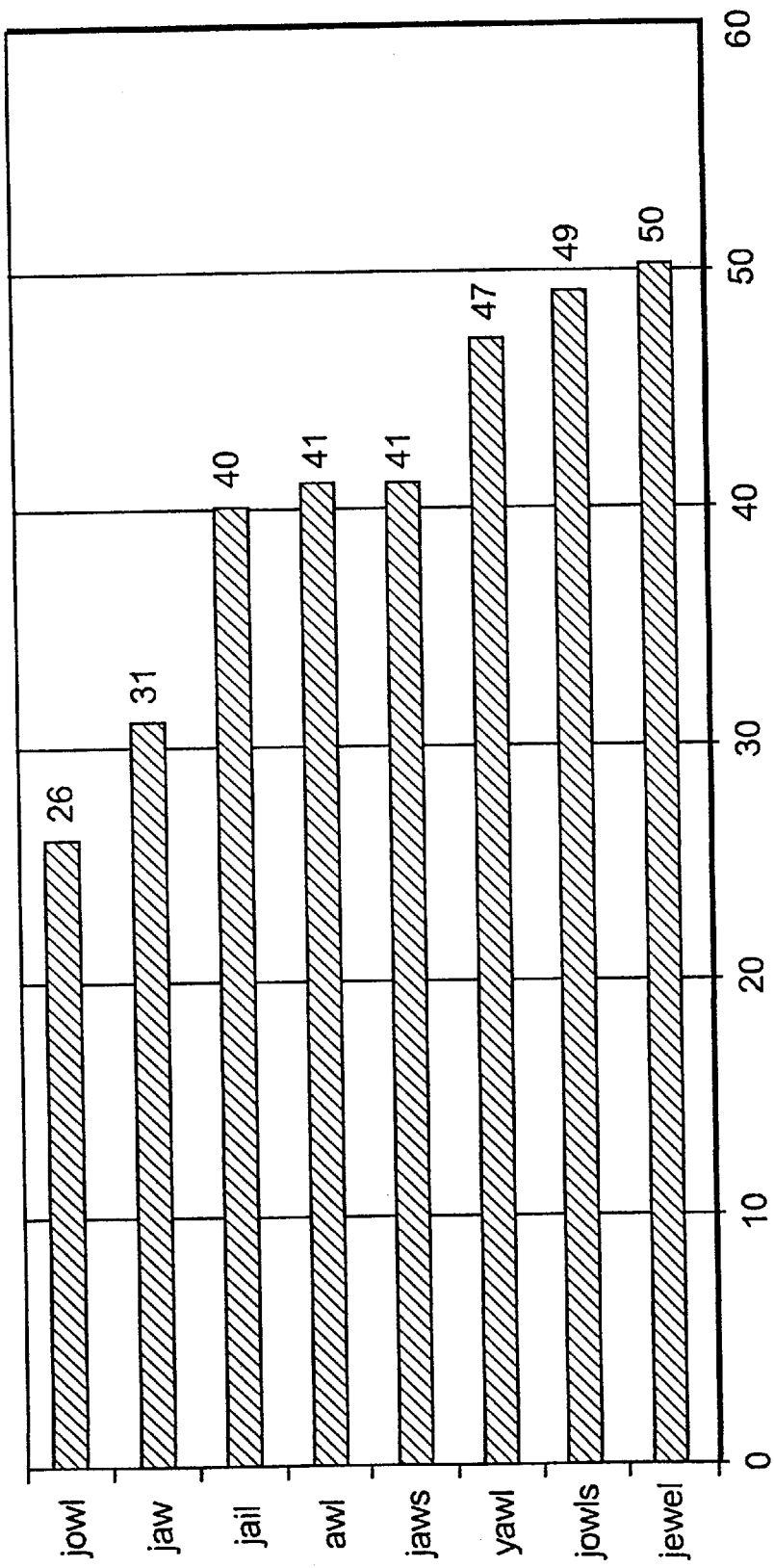
FIG. 5A is an illustration of the costs for some of the suggestions associated with the user input of "jawl".

Referring now to FIG. 5A, an illustration of the costs associated with suggestion for the user input of "jawl" is shown. It should be understood that the cost is typically in terms of penalty or distance, so that a suggestion with a small cost is a better suggestion than a suggestion with a large cost.

As illustrated in FIG. 5A, the best suggestion "jowl" has a cost of "26" associated with it. This cost is based upon the cost associated with substitution of an "a" for an "o", which is "28". Jowl also is a relatively common word for a frequency cost of "-2". Thus, the total cost for jowl is computing by adding "28" to "-2" for a total cost of "26".

The next best suggestion is "jaw" with a cost of "31". The cost of "31" is the cost associated with the addition of an "1" in the user input.

The next best suggestion after "jaw" is "jail". Jail has a total cost of "40" associated with it computed by adding the cost for a substitution of a "w" for an "i" (cost of "42") with the cost of a relatively common word (cost of "-2"). Likewise, similar rules are applied to the rest of the words in the suggestion list to obtain costs. It should be understood that the cost values are relatively arbitrary. The importance of the cost values is their relationship to one another and that they lead to a distance between suggestions with some meaning.

Referring now to FIG. 6, an illustration of typical entries in a built-in string list in accordance with an embodiment of the present invention is shown. It should be understood that the built-in string list includes phonetic and other special case corrections, including string substitutions and associated costs. FIG. 6 illustrates some of the entries in a typical built-in string list. It should be understood that for some string substitutions, it is necessary to have a cost pending for large offsets. For example, consider the string pair "kshu"→"xiou". When the offset is one, whether the particular suggestion has "xiou" in it can not yet be determined because currently only the "i" is examined. Thus, the offset is incremented to two and the method continues. When the dictionary word has "u" in it, the same thing happens at the next stage. Otherwise, this path ends. When we finally get to an offset equal to three, it can be determined whether the user string matches all of the dictionary string and costs can be assigned. As a matter of practice, in one embodiment, costs are actually assigned when the offset is one, but this path is forced to continue to assure that it continues to match the dictionary side of the string pair.

Illustrated in FIG. 6 are some of the elements of a typical built-in strings list including a user input string, a dictionary word string, and a cost stored together. Thus, for example, if the user inputs the word "hussle", one possible suggested word is "hustle" based upon the user inputting the string "sl" rather than the dictionary string "tl". A cost, or score, of "35" is stored in association with this error.

It should be understood that it is not always possible to determine with certainty the lowest cost suggestion and, thus, multiple paths are followed in some embodiments of the present invention. Afterwards, the path with the lowest cost is selected as the best suggestion. For example, consider the user input "developement" and the dictionary word "development". A cost is first determined, if possible, when the user input pointer is on the "m" after the "e" and the dictionary word pointer is on the "e" after the "m". This appears to be a perfect candidate for a transposition, yet a transposition is obviously incorrect in this case. When a transposition is detected, a cost is also determined for a user drop and a user add. For the user add, the user pointer is incremented, the user add cost is calculated, and traversal of the trie continues. Since this path, and this path only, has no further penalties, this path gives the correct cost for the dictionary word. The other paths give higher costs because they don't match after this point.

For example, in even more detail, suppose the user input is "developement" and the dictionary word is "development." The User input and dictionary word, or path, match until the third "e" in the user input:

User input—"develope" Dictionary word—"developm". The letters "e" and "m" at this point do not match, so the offset now becomes equal to one and the next letters are examined:

User input—"developem" Dictionary word—"developme".

The offset is currently equal to one and costs are determined. However, the following transformations are not in the built-in strings database:

"em"→"me"
"e"→"m"
"e"→"me"
"em"→"m"

For this example, these are the three possibilities for the type of transformation:

1. User Insert: 'em'→'m'. Suppose the cost for a user insert is 33. The pointer for the user input is on the "e" after the "m," the offset is reset to zero because of comparison between the user input and dictionary word. It should be understood that the offset is a state variable that essentially keeps track of an impeding cost. Once a cost is assigned, the offset is reset to zero.
2. Transposition: 'em'→'me'. Suppose the cost for a transposition is 20. The pointer for the user input on the last "m," and the offset becomes zero.
3. User Drop: 'e'→'me'. Suppose the cost for a user drop is 29. The pointer for the user input is on the "e" before the "m," and the offset becomes zero.

Each of the above-described possible transformations is examined further with the following results:

1. User Insert: 'em'→'m'–cost 33–offset becomes zero, user pointer is on "e" after the "m".

User input—"developemen"

Dictionary word—"developmen"

All subsequent letters match, so 33 is the final cost for this path.

2. Transposition: 'em'→'me'–cost 20–offset becomes zero, user pointer is on last "m".

User input—"developeme"

Dictionary word—"developmen"

The "e" of the user input and the "n" of the dictionary word do not match. The next comparison is:

User input—"developemen"

Dictionary word—"development"

This comparison results in a user insert: 'em'→'m' so that the total cost is 20 plus 33, or 53. The user pointer is at end of word and the offset is zero.

3. User Drop: 'e'→'me'–cost 29–offset becomes zero, user pointer is on the "e" before the"m".

User input—"developem"

Dictionary word—"developmen"

The "m" and "n" don't match–the next comparison is:

User input—"developeme"

Dictionary word—"development"

The "e" and the "t" don't match, so this path gets dropped altogether due to exceeding the predetermined threshold value.

Multiple Word Suggestions and Adding Spaces as a Penalty

It should also be understood that if there is an exact match of a dictionary word, or path, with a user input, but the user input has more letters than the dictionary word, then a space is added to the user input along with a space penalty and the method described in reference to FIG. 4 is reinitialized to begin searching for the second word as long as a dictionary word continues to exactly match the second word of the user input. Therefore, for example, a suggestion of "and will" will be generated for the user input of "andwill".

Modified Trie Traversal

FIG. 7 is an illustration of a modified, or "sloppy", trie traversal routine used in an embodiment of the present invention.

Automatic Replacement

Sometimes, the differences between the cost of one suggestion and the costs of all other suggestions are so large that the user input may be automatically replaced with the low cost suggestion, resulting in a high degree of replacement accuracy.

Figure 8:
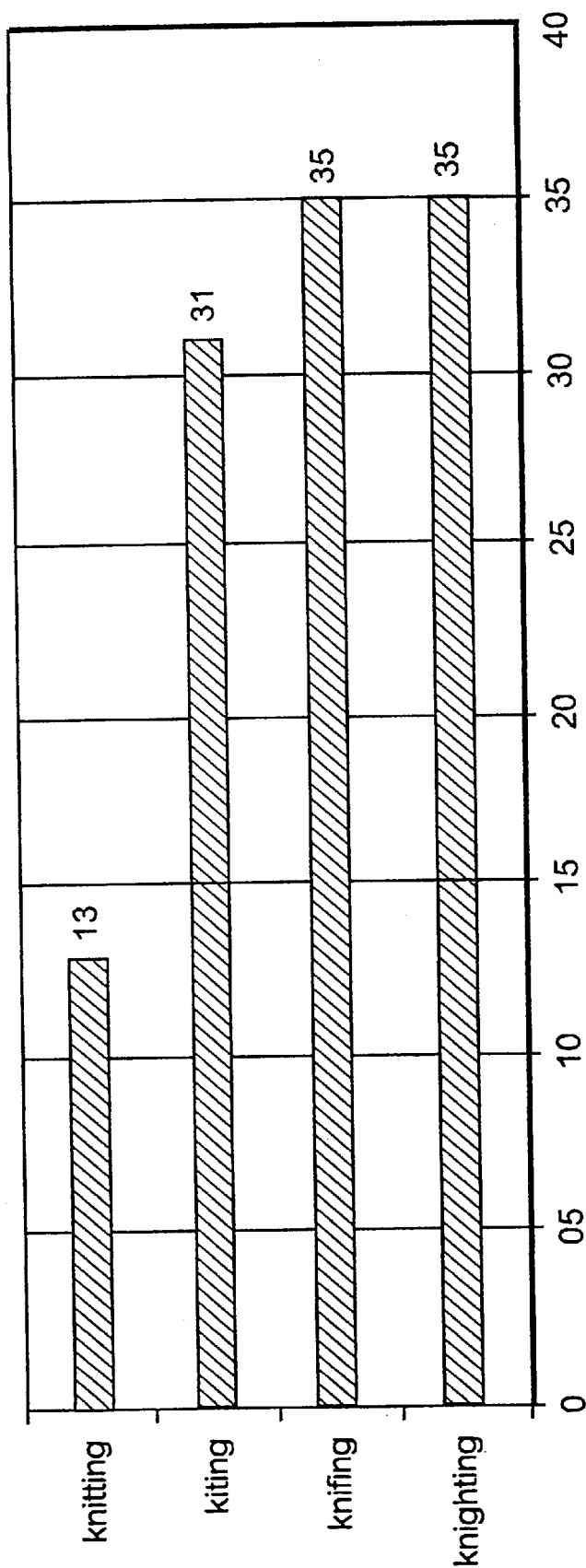
FIG. 8 is an illustration of the costs for some of the suggestions associated with the user input of "kniting".

Typically, an automatic replacement of a misspelled word is appropriate if there is a suggestion with a cost lower than 25 and the next lowest cost for a suggestion is at least twice the cost of the suggestion. For example, referring to FIG. 8, the costs of suggestions associated with the user input of "kniting" are illustrated. The lowest cost suggestion is "knitting" with a cost of "13" based upon the user dropping one of the letters of a doubled consonant. The next lowest cost suggestion is "kiting" with a cost of "31". Thus, because of the large difference in cost associated with "knitting", as opposed to all the other suggestions, it is an excellent candidate for use as an autoreplacement.

Built-In Strings Routine

Listed below is a built-in string routine, or database, as implemented in an embodiment of the present invention. The listing below is a detailed routine to implement a built-in string list, such as the built-in string list illustrated in FIG. 6.

```
[Double]     // this section must be first
             // words allowed to be doubled
had
that
this
in
Walla
[Parsing]
             // these characters get special treatment from
the parser.
             // they must ALL be marked as lexical by the
parsing table.
             // ALL of these characters get stripped off the
end of a word if the word doesn't verify with
             // the character in place.
             // For the first set of characters (.')
// we check against the lexicon -- if no match then
strip off the beginning
// or end of a word and recheck.
             // hence 'tis verifies, because 'tis (with the
apostrophe) verifies
// 'it also verifies, because it verifies (after the
apostrophe gets stripped).
'[0]x2019[0]x2018
             // this second group of characters is stripped
off the beginning or end of a word before attempting
to verify.
             // when they come in the middle of a word, the
character disappears when the word splits into two
parts.
             // if a piece doesn't verify, only that piece
doesn't verify.
-\/
[Suggest]
    // suggestion parameters
        // follows enumeration of SUGGPARAM in
lexdata.h
        42   // BandSize:  size of a suggestion
band
        27   // ThresholdBandSize:   distance
between top suggestion and end of band where we look
for suggestions
        2    // NBands: number of suggestion bands
    // AutoReplace Parameters
        //   Instead of threshold, I refer to
distance -- which is the maximum score less the
threshold.
        //   The          AutoRatio          is
(AutoNumerator/AutoDenominator)
        //   1. Take the AutoReplace distance and
add AutoIncrement x (InputwordLength -- AutoWord).
This is the Adjusted Distance.
        //   2. Multiply that by AutoRatio -- this
is the search zone. If greater than AutoMax, adjust
Adjusted Distance so that search zone equals AutoMax.
        //   3. Find all suggestions in the search
zone.
        //   4. To make an autoreplacement,
        //       1. Suggestion must be closer
than Adjusted Distance.
```

-continued

```
        //       2. The next suggestion (if there
is one) must be further than the first suggestion
times AutoRatio.
        5    // Autoword: word length to apply
AutoReplace threshold and AutoNumerator to
        4    // AutoIncrement: Decrease in AutoReplace
threshold for each additional letter
        76   // AutoNumerator: numerator in ratio of
band searched to accepted AR.
        //   Denominator in ratio of band searched to
accepted AR now set permanently to 32
        6    // increment in numerator for each letter
less than Autoword
        70   // minimum size of Numerator
        50   // AutoMax:      Maximum size of
AutoReplaceBand
        21   // AutoThresh,
        0    // sggprmDummy2,
        0    // sggprmDummy3,
[WordBegin]
        //   Word begin penalties for the SUBSTTYPE
enumeration in lexdata.h
        //   these penalties apply if the substitution is
at the beginning of a word
        //   in addition to whatever penalties apply for
the substitution itself.
        //   The notation Add, Drop, etc. is what the user
did with respect to the dictionary
        10   // Add
        12   // Drop
        12   // Substitute
        13   // DoubleSubstitute
        4    // MultipleSubstitute
        6    // Transpose
        0    // Dummy2
        0    // Dummy3
[WordEnd}
        //   ending penalties for the SUBSTTYPE enumeration
in lexdata.h
        //   these numbers REDUCE whatever penalties apply
for the substitution itself.
        2    // Add
        6    // Drop
        1    // Substitute
        1    // Doublesubstitute
        4    // MultipleSubstitute
        2    // Transpose
        0    // Dummy2
        0    // Dummy3
[Penalty]
        //   standard penalty values - in the Penalties
enumeration order in lexdata.h
        15   // DropDoubleConsonant
        17   // DropDoubleVowel
        15   // AdaDoubleConsonant
        17   // AddDoubleVowel
        16   // TransposeVowel
        18   // TransposeConsonant
        20   // Transpose
        23   // SubstituteVowel
        40   // SubstituteConsonant
        42   // Substitute
        29   // Drop
        33   // Add
        47   // DropSpace
        80   // SubstSpace
        14   // DropPunct
        18   // CapMatch
        25   // CapNoMatch
        45   // CapAll
        21   // Transpose3 -- reduce penalty for
earlier substitute by this much
        5    // SubstKeyAdj -- reduce penalty for
substitution of nearby keyboard char
        3    // TransKeyAdj -- reduce penalty for
transposition of nearby keyboard char
        60   // SubstPunct
        45   // AddPunct
        30
```

```
[Frequency]
        //   frequency adjustment values
        0    //frqpenNormal,
        -5   //frqpenVery,
        -2   //frqpenSomewhat,
        4    //frqpenInfrequent.
[Lookup]   // the limits of the lookup table for
the score array
a
z
[Defines]  // for use in the next section
PenaltySubstituteVowel      23
PenaltySubstituteConsonant  440
PenaltySubstitute           42
PenaltyTransposeConsonant   18
PenaltyDrop                 29   // drop a letter
PenaltyAdd                  32   // add a letter
InsoDefault                 40
InsoDrop                    29
InsoAdd                     33
InsoTranspose               18
[Substitute]
        //  specific penalties for various substitutions
        //  first column is what the user typed
        //  second is what is in the dictionary
        //  third is penalty for that substitution
        //  fourth is added to third if present
        //  drop
        y       ey      PenaltyDrop       -5
        n       kn      5
        s       es      PenaltyDrop       -5
        t       't      17
        i       -i      17
        //  adds
        ey      y       28
        es      s       19
        //  single letter substitutions
        //  these vowels cross among themselves
pretty well
        e       a       PenaltySubstituteVowel   -1
        i       a       PenaltysubstituteVowel
        a       e       PenaltySubstituteVowel
        i       e       PenaltySubstituteVowel
        a       i       PenaltySubstituteVowel
        e       i       PenaltySubstituteVowel
        //  as do these two
        u       o       PenaltySubstituteVowel   -1
        o       u       PenaltySubstituteVowel   -1
        //  but these vowels are less likely to
substitute
        o       e       PenaltySubstituteVowel   +5
        u       e       PenaltySubstitutevowel   +5
        o       a       PenaltySubstitutevowel   +5
        u       a       PenaltySubstituteVowel   +5
        o       i       PenaltySubstituteVowel   +5
        u       i       PenaltySubstituteVowel   +5
        a       o       PenaltySubstituteVowel   +5
        e       o       PenaltysubstituteVowel   +5
        i       o       PenaltySubstituteVowel   +5
        a       u       PenaltySubstituteVowel   +5
        e       u       PenaltySubstitutevowel   +5
        i       u       PenaltySubstituteVowel   +5
        y       i       PenaltySubstituteVowel   -2
        i       y       PenaltySubstituteVowel   -2
        y       e       PenaltySubstituteVowel   +15
        e       y       PenaltySubstituteVowel   +15
        c       k       PenaltySubstituteConsonant  -
21      //      19
        k       c       PenaltySubstituteConsonant  -
21
        z       s       PenaltySubstituteConsonant  -
21
        s       z       PenaltySubstituteConsonant  -
21
        ;       '       PenaltySubstitute         -13
        .       '       PenaltySubstitute         -12
        :       '       PenaltySubstitute         -12
        \       '       PenaltySubstitute         -12
        /       '       Penaltysubstitute         -12
```

-continued

| | | | | |
|---|---|---|---|---|
| " | ' | PenaltySubstitute | −12 | |
| \0x201c | ' | PenaltySubstitute | −12 | |
| \0x201d | ' | PenaltySubstitute | −12 | |
| x | - | 5 | | // X becomes a space |
| - | x | 5 | | //X becomes a space |
| t | d | PenaltySubstituteConsonant | −10 | |
| d | t | PenaltySubstituteConsonant | −5 | |
| b | p | PenaltySubstituteConsonant | −5 | |
| k | g | PenaltySubstituteConsonant | +10 | |
| s | c | PenaltySubstituteConsonant | −10 | |
| c | s | PenaltySubstituteConsonant | −8 | |
| u | w | PenaltySubstitute | −1 | // suab -> swab |

// transpositions

| | | | |
|---|---|---|---|
| ht | th | PenaltyTransposeConsonant | −6 |

// Some Phonetics

| | | | | |
|---|---|---|---|---|
| al | le | PenaltySubstitute | | // artical -> article; tactial -> tactile |
| le | al | PenaltySubstitute | −10 | // sandle -> sandal |
| il | le | PenaltySubstitute | | // axil -> axle |
| y | ee | PenaltySubstitute | 25 | // committy -> committee |
| at | te | PenaltySubstitute | 40 | // compleat -> complete |
| ew | ue | Penaltysubstitute | 35 | // dew1 -> duel |
| ue | ew | PenaltySubstitute | 35 | // strue -> strew |
| sl | tl | PenaltySubstitute | 35 | //hussle -> hustle |
| k | gu | PenaltySubstitute | 35 | // kiche -> quiche |
| ede | ead | PenaltySubstitute | 22 | // lede -> lead |
| id | de | PenaltySubstitute | −10 | // lemonaid -> lemonade; traid -> trade |
| ff | ft | PenaltySubstitute | 40 | //offen -> often |
| ul | le | PenaltySubstitute | 50 | //particul -> particle |
| k | ch | PenaltySubstitute | 30 | //skism -> schism |
| ie | y | PenaltySubstituteVowel | 5 | // tieing -> tying |
| y | ie | PenaltySubstituteVowel | 5 | |
| j | g | PenaltySubstitute | −8 | |
| g | j | PenaltySubstitute | −8 | |
| ey | i | PenaltySubstitute | | |
| i | eo | PenaltySubstitute | | |
| i | ae | PenaltySubstitute | | |
| u | oo | PenaltySubstitute | −15 | |
| f | ph | PenaltySubstitute | −5 | |
| f | gh | PenaltySubstitute | | |
| s | ps | PenaltyDrop | −1 | |
| ps | s | PenaltyAdd | −1 | |
| pn | n | PenaltyAdd | −5 | |
| t | pt | PenaltyDrop | −5 | |
| w | e | PenaltySubstitute | −1 | |
| e | w | PenaltySubstitute | −1 | // windoes -> windows |
| o | ow | PenaltyDrop | −3 | // lo ->low |
| ve | f | PenaltySubstitute | | |
| f | ve | PenaltySubstitute | −11 | |
| t | ch | PenaltySubstitute | +8 | |
| ch | t | PenaltySubstitute | +8 | |
| j | h | PenaltySubstitute | −5 | |
| h | j | PenaltySubstitute | −5 | |
| thru | through | PenaltySubstitute | −20 | // thru -> through |
| hilite | highlight | PenaltySubstitute | −20 | |
| wensday | Wednesday | PenaltySubstitute | −20 | |
| spoonsful | spoonfuls | PenaltySubstitute | −20 | |
| tho | though | PenaltySubstitute | −20 | |
| donut | doughnut | PenaltySubstitute | −20 | |
| sargent | sergeant | PenaltySubstitute | 17 | // sargent -> sergeant |
| alot | axlot | PenaltyDrop | −10 | // hardwire |
| midevil | medieval | PenaltySubstitute | | |
| asa | asXa | PenaltyDrop | | |
| sence | science | PenaltySubstitute | | // consence -> conscience |
| bras | barrass | PenaltySubstitute | | // embras ->embarrass |
| que | queue | PenaltySubstitute | | // que -> queue |
| soi | soXi | PenaltyDrop | | // soI -> so I |
| kshu | xiou | PenaltySubstitute | +2 | // ankshus -> anxious |
| air | are | PenaltySubstitute | −4 | // compair -> compare; dair -> dare; thoroughfair -> thoroughfare |
| shus | tious | PenaltySubstitute | +2 | // fictishus -> fictitious |
| eart | ard | PenaltySubstitute | +2 | // foolhearty -> foolhardy |
| sha | chsia | PenaltySubstitute | +2 | // fusha -> fuchsia |
| t | ght | PenaltySubstitute | −5 | // heit -> height |
| ff | ugh | PenaltySubstitute | +2 | // laff -> laugh |
| yew | ieu | PenaltySubstitute | +2 | // milyew -> milieu |
| it | ute | PenaltySubstitute | +2 | // minit -> minute |
| us | eous | PenaltySubstitute | −5 | // outragus -> outrageous |
| te | ght | PenaltySubstitute | −5 | // playwrite -> playwright |
| cks | x | PenaltySubstitute | +2 | // relacks -> relax |
| us | ious | PenaltySubstitute | +2 | // religus -> religious |
| ar | re | PenaltySubstitute | −5 | // sevear -> severe; sphear -> sphere; ampear -> ampere; toar -> tore |
| ne | gn | PenaltySubstitute | | // aline -> align |
| is | ous | PenaltySubstitute | | // amoris -> amorous; famis -> famous |
| ana | anti | PenaltySubstitute | −5 | // anabiotic -> antibiotic |
| ttide | theid | PenaltySubstitute | | // aparttide -> apartheid |
| en | ion | PenaltySubstitute | | // millen -> million |
| ay | et | PenaltySubstitute | +5 | // valay -> valet |
| ea | ehe | PenaltySubstitute | +5 | // veament -> vehement |
| in | ne | PenaltySubstitute | | // wain -> wane; plain -> plane |
| ne | in | PenaltySubstitute | −5 | // strane -> strain; trane -> train; chane -> chain |
| aig | age | PenaltySubstitute | +5 | // waig -> wage |
| te | it | PenaltySubstitute | −10 | // wate -> wait; concete -> conceit; pursute -> pursuit |
| oak | oke | PenaltySubstitute | | // stoak -> stoke |
| shence | scious | PenaltySubstitute | | // subconshence -> subconscious |
| ete | eat | PenaltySubstitute | −8 | // swete -> sweat |
| ante | aint | PenaltySubstitute | +5 | // tante -> taint |
| year | ure | PenaltySubstitute | | // tenyear -> tenure |
| ere | ear | PenaltySubstitute | | // tere -> tear |
| urow | orough | PenaltySubstitute | +5 | thurow |

-continued

```
        -> thorough
            oste       oast    PenaltySubstitute  +5    // toste ->
toast
            icisit     icit    PenaltySubstitute  +5    // toxicisit
-> toxicity
            ale        ail     PenaltySubstitute        // trale ->
trail; travale -> travail
            ed         ead     PenaltySubstitute        // tred ->
tread
            uer        our     PenaltyAdd               // tuer -> tour
            uff        ough    PenaltySubstitute  +5    // tuffin ->
toughen
            ai         eigh    PenaltySubstitute        // underwait
-> underweight
            icke       ique    PenaltySubstitute        // unicke ->
unique
            ence       ous     PenaltySubstitute
//unconscience -> unconscious
            chat       cacciat PenaltySubstitute  +5 //
cachatory -> cacciatore
            ne         ign     PenaltySubstitute  +5    // compane ->
campaign
            rrit       rat     PenaltySubstitute  +5    // carrit ->
carat
            rrit       ret     PenaltySubstitute  +4    // carrit ->
caret
            tch        cci     PenaltySubstitute        // catchatory
-> cacciatore
            lli        le      PenaltySubstitute  +5    // cellibrate
-> celebrate
            sic        cis     PenaltySubstitute        // consice ->
concise
            ore        our     PenaltyDrop       -1  //  contore ->
contour
            ade        eyed    PenaltySubstitute        // convade ->
conveyed
            or         oar     PenaltyDrop       -5  //corse -> coarse
            erat       at      PenaltyDrop       -5  //curerater ->
curator
            rie        ris     PenaltySubstitute  -5    // debrie ->
debris
            ec         iss     PenaltySubstitute  -5    // decension
-> dissension
            eff        eaf     PenaltySubstitute  -10 // deff ->
deaf
            tion       tation  PenaltySubstitute  -5  //
deforestion -> deforestation
            sorta      sortxof PenaltySubstitute
            kindakindXof       PenaltySubstitute
            wannawantXto       PenaltySubstitute
            'bout      about   PenaltySubstitute
            druther    rather  PenaltySubstitute
            dunnodon'tXknow   PenaltySubstitute
            betcha     betXyou PenaltySubstitute
            gonnagoingxto      PenaltySubstitute
            gotta      gotXto  PenaltySubstitute
            gotcha     gotXyou PenaltySubstitute
            ooth       othe    PenaltySubstitute  -5 //
clooth -> clothe
            sel        tle     PenaltySubstitute  -5 //
cassel -> castle
            i          yi      PenaltyAdd        -2 // carring ->
carrying
            cquer      quor    PenaltyAdd               // licquer ->
liquor
            mm         mb      PenaltySubstitute  -13
//plumming -> plumbing
            scheam     scheme  PenaltySubstitute  -3
//scheam -> scheme
            m          nd      PenaltySubstitute
//Grampa -> Grandpa
            eepedept   PenaltySubstitute         -5 //keeped ->
kept; sweeped -> swept
            us         ass     PenaltySubstituteVowel   +2
//carcus -> carcass
            ess        ace     PenaltySubstitute  +5
//neckless -> necklace
            e          ia      PenaltySubstitute
//brevery -> breviary
            lla        le      PenaltySubstitute
//cellabrate -> celebrate
            lle        la      PenaltySubstitute
//palletible -> palatable
            az         ais     PenaltySubstitute        //dazy
-> daisy
            ks         x       PenaltySubstitute  -10
            une        oon     PenaltySubstitute
//marune -> maroon
            aik        gke
            aim        ame
            alt        ate
            aw         au
            ays        ace
            aye        ai
            ay         e // for the accented e
            a          er
            bil        buil
            che        ce
            ce         sce
            ch         tch
            ch         ti
            ck         ke
            cse        ce
            ct         x
            cw         qu
            c          qu
            dd         tt
            dg         g
            ea         i
            ee         i
            eri        ri
            er         our
            er         re
            ew         u
            e          oe
            fi         phy
            ggs        x
            gs         x
            gz         x
            g          dg
            g          gu
            h          wh
            is         yz
            ji         gy
            j          di
            j          dj
            kay        quet
            ke         ck
            kw         qu
            k          cc
            k          ck
            m          gm
            m          mb
            m          mn // colum -> column; condem ->
condemn
            nf         mph
            n          gn
            n          pn
            oe         e
            oi         ir
            om         alm
            or         our
            our        or
            ow         ou
            o          au
            pt         pped
            p          pt
            re         er
            ri         eri
            r          wr
            sa         ci
            sce        se
            se         sce
            sh         c
            sh         ci
            sh         sci
            sh         si
            sh         ssi
```

-continued

| | |
|---|---|
| sh | t |
| sh | ti |
| si | ce |
| si | sci |
| sl | stl |
| sm | sthm |
| ss | c |
| tch | ch |
| u | ou |
| who | ho |
| wr | r |
| x | cc |
| x | cs |
| y | igh |
| z | x |

From the foregoing description, it will be apparent to those skilled in the art that the present invention provides a method and system for generating a cost, or score, in association with a possible suggestion to replace a misspelled word in an electronic document. Thus, the method of the present invention may also be used to will pass a value, or cost, to a client application, indicating the level of confidence in returning the correct suggestion. The client application can then decide how high the returned value has to be in order to automatically replace the suggested word with the misspelled word.

Although the present invention has been described above as implemented in a spell checker program module, as part of a word processing program module, it should be understood that the present invention may be implemented in other program modules.

It should be understood that although the present invention is described above with reference to a trie and traversal of the trie, the present invention should not be limited to the use of tries. Any suitable means for comparing a dictionary word to a user input may be used in conjunction with the present invention so long as a transformation may be obtained. The transformation may then be used to determine a cost in association with a suggestion for replacing the user input and, in certain circumstances, for automatically replacing the user input with the suggestion.

It will also be understood that alternative embodiments will become apparent to those skilled in the art to which the present invention pertains without departing from its spirit and scope. Accordingly, the scope of the present invention is defined by the appended claims rather than the foregoing description.

What is claimed is:

1. For an electronic system for spell-checking an electronic document, a method for generating a numerical cost in association with a suggested word for replacing a misspelled word, the method comprising the steps of:

comparing the suggested word to the misspelled word to determine the transformation between the suggested word and the misspelled word and assigning a cost to that transformation, wherein the cost is based on determining whether the transformation is stored in a built-in string list; and if so, retrieving a built-in string numerical cost from the built-in string list and if the transformation matches one of a plurality of generic transformation types comprising a generic numerical cost stored in association with the matching generic transformation type, then retrieving the generic numerical cost.

2. The method recited in claim 1, wherein the plurality of generic transformation types comprises a substitution, a deletion, an insertion, and a transposition.

3. The method recited in claim 2, further comprising the step of:

if the transformation does not match one of a plurality of generic transformation types, then storing an indication that a numerical cost could not be determined in association with the suggested word.

4. A computer-readable medium having computer-executable instructions for performing the steps recited in claim 3.

5. For an electronic system for creating and editing an electronic document, a method for generating a numerical cost in association with suggested words for replacing a misspelled word, the method comprising the steps of:

(a) determining whether an offset value is equal to zero, wherein the offset value is equal to the number of previous letters in one of the suggested words that have not matched the misspelled word;

(b) if the offset value is not equal to zero, then determining associated numerical costs for possible paths of a trie and applying these associated numerical costs to their corresponding paths; and (c) adding end costs, beginning costs, and frequency costs to the paths, resulting in a total numerical cost for each path.

6. The method recited in claim 5, wherein each path corresponds to a suggested word for replacing the misspelled word.

7. The method recited in claim 5, where the total numerical cost computed for each path corresponding to each suggested word is transmitted to the main application for its use in response to a misspelled word.

8. For an electronic system for creating and editing an electronic document, a method for generating a numerical cost in association with suggested words for replacing a misspelled word, the method comprising the steps of:

(a) determining whether an offset value is equal to zero, wherein the offset value is equal to the number of previous letters in one of the suggested words that have not matched the misspelled word;

(b) if the offset value is not equal to zero, then determining associated numerical costs for possible paths of a trie and applying these associated numerical costs to their corresponding paths;

(c) adding end costs, beginning costs, and frequency costs to the paths, resulting in a total numerical cost for each path; and, (d) transmitting the total numerical cost for each path to the main application for its use in response to a misspelled word.

* * * * *